US010732073B1

(12) United States Patent
Ko et al.

(10) Patent No.: US 10,732,073 B1
(45) Date of Patent: Aug. 4, 2020

(54) METHOD FOR PREDICTING STRUCTURE SHAPE DEFORMATIONS

(71) Applicant: United States of America as Represented by the Administrator of NASA, Washington, DC (US)

(72) Inventors: William L Ko, Lancaster, CA (US); Van T Fleischer, Lancaster, CA (US); Shun-Fat Lung, Valencia, CA (US)

(73) Assignee: U.S.A. as Represented by the Administration of the National Aeronautics and Space Administration, Washington, DC (US)

( * ) Notice: Subject to any disclaimer, the term of this patent is extended or adjusted under 35 U.S.C. 154(b) by 169 days.

(21) Appl. No.: 15/724,842

(22) Filed: Oct. 4, 2017

Related U.S. Application Data

(60) Provisional application No. 62/407,343, filed on Oct. 12, 2016.

(51) Int. Cl.
*G01M 5/00* (2006.01)
*G01B 7/16* (2006.01)

(52) U.S. Cl.
CPC ............ *G01M 5/0041* (2013.01); *G01B 7/16* (2013.01); *G01M 5/0016* (2013.01)

(58) Field of Classification Search
CPC ...... G01M 5/0041; G01M 5/0016; G01B 7/16
See application file for complete search history.

(56) References Cited

U.S. PATENT DOCUMENTS

| 7,520,176 B1 | 4/2009 | Ko et al. |
| 7,715,994 B1 * | 5/2010 | Richards ............. G01M 5/0016 702/42 |

* cited by examiner

*Primary Examiner* — Peter J Macchiarolo
*Assistant Examiner* — John M Royston

(57) ABSTRACT

The invention is a method for obtaining the curved displacement of a flexible structure by using strain measurements obtained by strain sensors. By obtaining the displacement of structures in this manner, one may accurately construct the deformed shape of the structure under large geometric nonlinear deformations and display said deformed shape in real-time, enabling active control of the structure shape if desired.

14 Claims, 4 Drawing Sheets

METHOD FOR PREDICTING STRUCTURE SHAPE DEFORMATIONS

CROSS-REFERENCE TO RELATED APPLICATIONS

The present application claims the benefit of provisional patent application Ser. No. 62/407,343, filed Oct. 12, 2016 by the present inventor(s), which is incorporated by reference in its entirety. U.S. Pat. No. 7,520,176, issued Apr. 21, 2009 by the present inventor(s), is hereby incorporated by reference.

STATEMENT OF GOVERNMENT INTEREST

The invention described herein may be manufactured and used by or for the Government of the United States of America for governmental purposes without payment of any royalties thereon or therefor.

FIELD OF THE INVENTION

The present invention relates to deformable structures, and more specifically to predicting shape deformations of deformable structures.

BACKGROUND OF THE INVENTION

The Helios prototype (wing span 247 ft.) broke-up in mid-air at an altitude of 2,800 feet under very large wing dihedral deformation (wing tip deflection reaching 40 ft.). Flexible structures, such as the wings on the Helios prototype aircraft, can benefit from a technology for monitoring deformations. In the case of highly flexible aircraft, it can be advantageous to monitor deformations of structures for feedback control and flight safety.

DESCRIPTION OF THE RELATED ART

Strain sensors can only measure surface strains and not the deformed shape. However, this changed after the development of a new prediction technology disclosed in Method for Real-Time Structure Shape-Sensing (U.S. Pat. No. 7,520,176) was created. This technology uses the Displacement Transfer Functions to transform rectilinearly distributed surface strains into out-of-plane deflections for mapping overall structure deformed shapes for visual displays.

By entering the surface strain data into the Displacement Transfer Functions, one can calculate slopes and deflections along each strain-sensing line on a given structure, such as a wing. By using multiple strain-sensing lines, overall deformed shapes of a structure subjected to ending and torsion loadings can be obtained. Seven sets of Displacement Functions have previously been formulated for different structural geometries.

By embodying the Displacement Transfer Functions, the rectilinearly distributed surface strains can also be input into the Stiffness and Load Transfer Functions to calculate structural stiffness (bending and torsion) and operational loads (bending moments, shear loads, and torques) for monitoring a flight-vehicle's operational loads in near real-time.

To be clear, previous Displacement Transfer Functions have been formulated based on the shifted straight deflections perpendicular to the undeformed neutral axis.

SUMMARY OF THE INVENTION

The present invention comprises a method for obtaining the out-of-plane deformations (i.e. structural deformations due to bending) of a flexible structure by using strain measurements obtained by strain sensors. By obtaining the displacement of structures in this manner, one may construct the deformed shape of the structure and display said deformed shape in real-time, enabling active control of the structure shape if desired. In particular, the method proposed herein utilizes new Curved Displacement Transfer Functions for accurate shape predictions of structures under large geometric nonlinear deformations.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

The invention, as embodied herein, comprises a method of obtaining curved displacement of a flexible structure by using strain measurements taken along the structure. For the present invention, the term displacement is defined as deformation of a structure out of the plane of the structure as applied to the structure's neutral axis 203. The term neutral axis is defined as the axis obtained by determining the axis or center point at each cross section of the structure.

Figure 2:
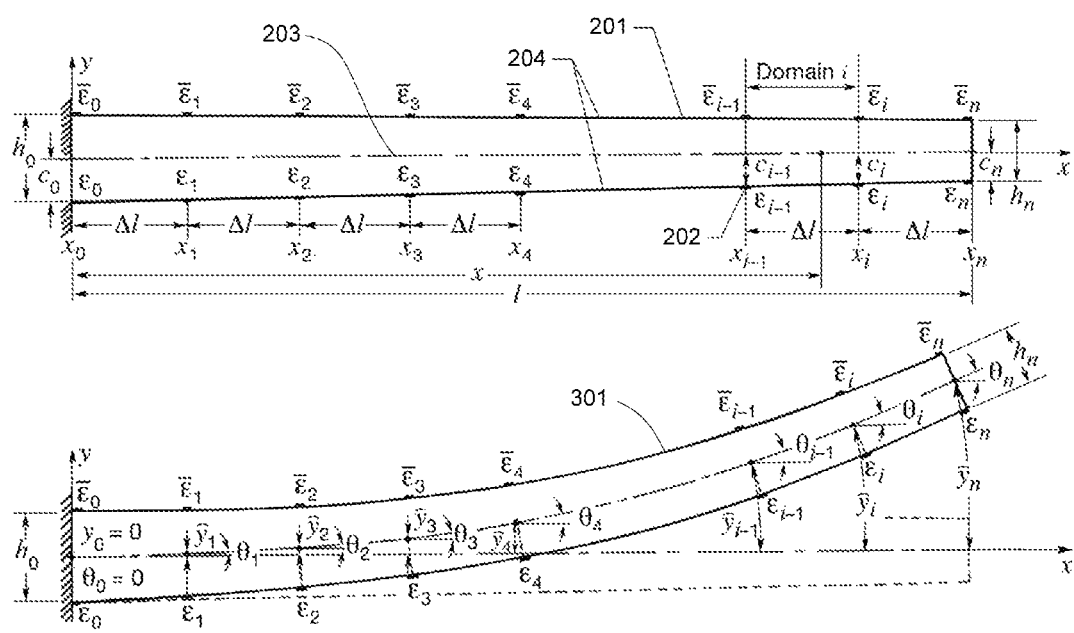
FIG. 2 depicts a depth-wise cross section of a tapered cantilever tubular beam to which the present invention may be employed.

To formulate the displacement theory, strain-sensing stations (strain measurement points) 202 are to be discretely distributed along a strain-sensing line on the surface of the structure (e.g., aircraft wing) as shown in FIG. 2. The depth-wise cross section of the structure along the strain-sensing line is called an imaginary "embedded beam" 201 (not to be confused with the classical isolated Euler-Bernoulli beam). Each embedded beam 201 was then discretized into multiple domains (strain-sensing station separation distances) with domain junctures matching the locations of the strain-sensing stations 202. By discretization, the variation of the embedded beam depth factor can be described with a piecewise linear function, and the surface strain variation can be described with either a piecewise linear or a piecewise nonlinear function. This approach enables the integration of the curvature equation of the deformed embedded beam to yield slope and deflection equations in recursive forms. The recursive slope and deflection equations are then combined into a single deflection equation in dual summation form.

A set of three equations (recursive slope equation, recursive deflection equation, and dual-summation deflection equation) are called Displacement Transfer Functions, which are expressed in terms of the embedded beam geometrical parameters and surface strains, and contain no material properties.

By entering surface strain data into the Displacement Transfer Functions, one can calculate slopes and deflections along the embedded beam. By using multiple strain-sensing lines 204, deflections at multiple strain sensing stations 202 can then be calculated for plotting the overall deformed shapes of the structure subjected to bending and torsion loads. Using the Displacement Transfer Functions, one can accurately compute the associated deflections whether the input surface strains come from linear or nonlinear deformations.

Basic Equations for the Displacement Theory

The following sections discuss different curvature-strain differential equations for the formulation of different Displacement Transfer Functions.

Curvature-Strain Relationship

Figure 3:
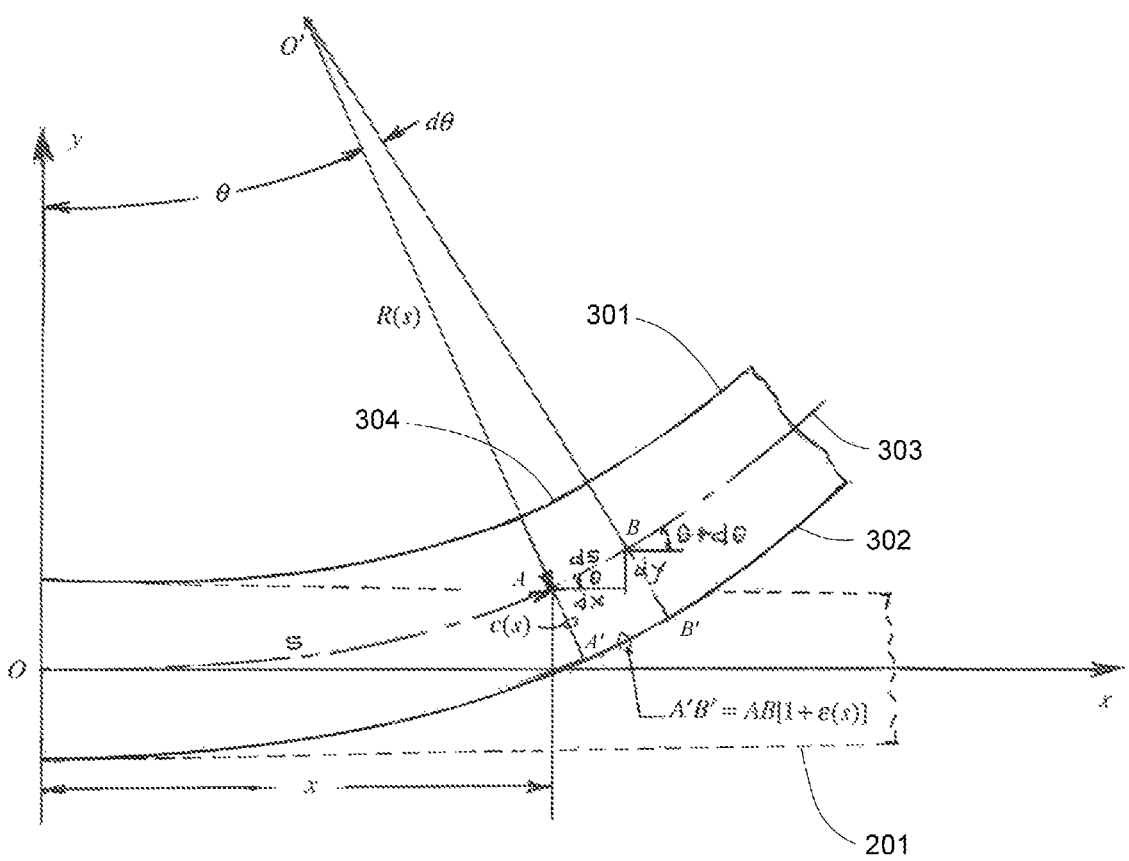
FIG. 3 depicts the deformed state of an embedded beam with a changing depth factor.

FIG. 3 shows the deformed state of an embedded beam with a changing depth factor c(s), where s is the curved coordinate along the elastic curve 303 of the deformed embedded beam 301. The curvature-strain relationship can be established graphically from FIG. 3. The embedded beam elastic curve 303 has local radius of curvature R(s) within a small beam segment 304 subtended by $d\theta$. The undeformed curve length AB lies on the beam neutral axis 203, and the deformed curve length A'B' $\{=AB[1+\varepsilon(s)]\}$ [where $\varepsilon(s)$ is the surface strain] lies on the beam lower surface 302. From the two similar slender sectors O'AB and O'A'B', one obtains the geometrical relationship described with equation (1):

$$\frac{O'A'}{O'A} = 1 + \frac{c(s)}{R(s)} = \frac{A'B'}{AB} = 1 + \varepsilon(s) \quad (1)$$

From equation (1), one obtains the curvature-strain equation (2):

$$\frac{1}{R(s)} = \frac{\varepsilon(s)}{c(s)} \quad (2)$$

Equation (2) geometrically relates the local curvature $1/R(s)$ to the associated surface strain $\varepsilon(s)$ and the depth factor c(s) of the embedded beam. Equation (2) is the basis for formulating any Displacement Transfer Functions.

Traditional Curvature Equations for Vertical Deflections

Different forms of curvature-strain differential equations written in x-y system have the following familiar forms:

1. Eulerian Curvature Equation:

$$\frac{1}{R(x)} = \frac{d^2y/dx^2}{[1+(dy/dx)^2]^{3/2}} = \frac{\varepsilon(x)}{c(x)} \quad (3)$$

It is important to mention that equation (3) is referenced to the deformed (movable) x-coordinate, (i.e., x gives only the deformed location of a material point, but not the undeformed location).

2. Lagrangian Curvature Equation $$\frac{1}{R(x)} = \frac{d^2y/dx^2}{\sqrt{1-(dy/dx)^2}} = \frac{\varepsilon(x)}{c(x)} \quad (4)$$

Equation (4) is in reference to the undeformed (fixed) x-coordinate.

Because of the nonlinear term $(dy/dx)^2$, direct integrations of equations (3) and (4) can end up in extremely complex deflection equations, which have poor prediction accuracies at large deformations.

3. Shifted Curvature Equation

If the deformed material points are shifted back to their respective undeformed x-positions [i.e., by setting axial displacement u to zero (u→0)] (FIG. 4), the shifting condition (u→0) will cause the nonlinear term $(dy/dx)^2$ to become zero. Hence equation (4) becomes:

$$\frac{d^2y}{dx^2} = \frac{\varepsilon(x)}{c(x)} \quad (5)$$

Formulation of the Shifted Displacement Transfer Functions

The Shifted Displacement Transfer Functions have been formulated previously by piecewise integrations of equation (5) for nonuniform embedded beams.

Formulation of Curved Displacement Transfer Functions

The following sections present mathematical processes needed for the formulation of the new Curved Displacement Transfer Functions based on curved deflections instead of traditional vertical deflections.

Curved Curvature Equations

Figure 4:
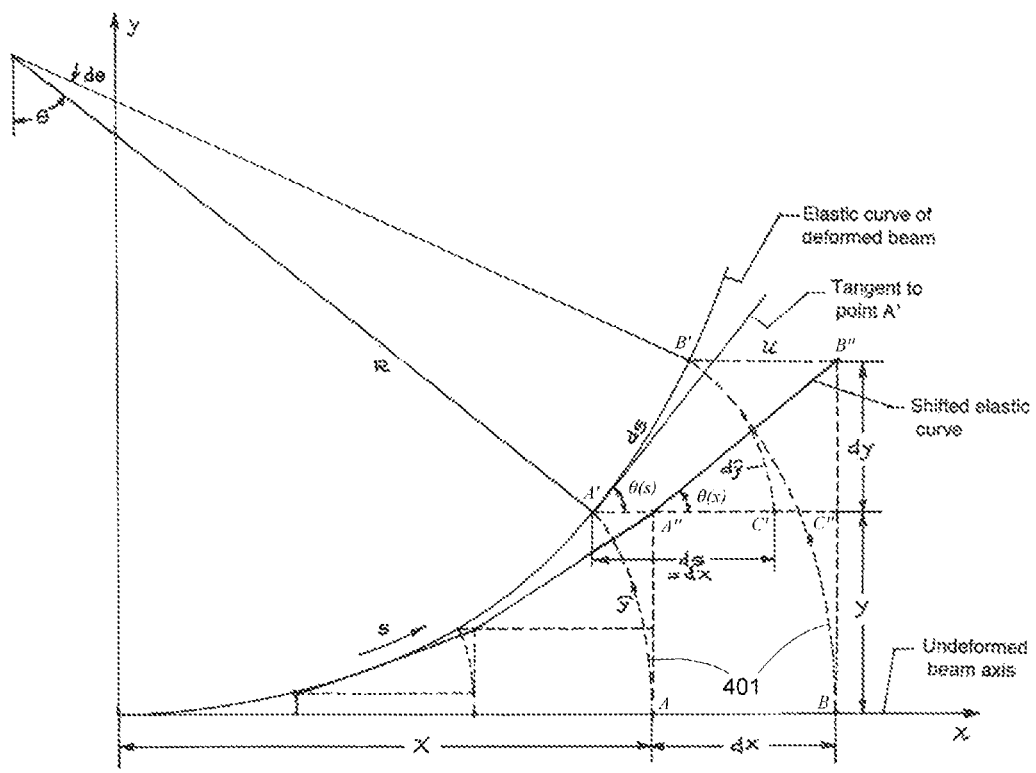
FIG. 4 depicts an elastic curve of a deformed embedded beam, showing true curved deflections.

For large bending deformations of beams, as in FIG. 4, the actual (true) deflection $\hat{y}$ of a material point is a curved distance traced 401 by the same material point from its initial undeformed position to its final deformed position. Thus, the conventional deflection y is merely the vertical component of the curved deflection, $\hat{y}$.

The basic curvature equation referenced to the curvilinear s-$\hat{y}$ system, instead of traditional Cartesian x-y system, can be expressed as equation (8):

$$\frac{1}{R(s)} = \frac{d\theta(s)}{ds} = \frac{d}{ds}\left(\frac{d\hat{y}}{ds}\right) = \frac{d^2\hat{y}}{ds^2}; \theta(s) = \frac{d\hat{y}}{ds} \quad (8)$$

Equating equations (2) and (8) gives the curvature-strain differential equation (9) in s-$\hat{y}$ system for large deformations:

$$\frac{d^2\hat{y}}{ds^2} = \frac{\varepsilon(s)}{c(s)} \quad (9)$$

Equation (9) is a purely geometrical relationship, containing no material properties. Assuming the length of neutral axis of the embedded beam remains the same (i.e. s=x) after bending, equation (9) can be rewritten in reference to the undeformed x-system as equation (10):

$$\frac{d^2\hat{y}}{dx^2} = \frac{\varepsilon(x)}{c(x)} \quad (10)$$

The mathematical process for formulating the Curved Displacement Transfer Function is through the piecewise integration of equation (10) and is described as follows.

Piecewise Representations

To enable piecewise integrations of equation (10), the depth factor c(x) and the surface strain $\varepsilon(x)$ can be expressed by either piecewise linear or piecewise nonlinear functions as described as follows.

1. Depth Factors

The variations of the embedded beam depth factor c(x) within each small domain $x_{i-1} \leq x \leq x_i$ (i=1, 2, 3, ..., n) can be expressed with linear function given by equation (11):

$$c(x) = c_{i-1} + (c_i - c_{i-1})\frac{x - x_{i-1}}{\Delta l}; \quad x_{i-1} \leq x \leq x_i \quad (11)$$

2. Surface Strains

The variation of the surface bending strain ε(x) within each small domain $x_{i-1} \leq x \leq x_i$, can be expressed by either a linear function given by equation (12) or by a nonlinear function given by equations (13-a, b):

a. Linear:

$$\varepsilon(x) = \varepsilon_{i-1} + (\varepsilon_i - \varepsilon_{i-1})\frac{x - x_{i-1}}{\Delta l}; \quad x_{i-1} \leq x \leq x_i \quad (12)$$

b. Nonlinear:

$$\varepsilon(x) = \varepsilon_{i-1} - \frac{3\varepsilon_{i-1} - 4\varepsilon_i + \varepsilon_{i+1}}{2\Delta l}(x - x_{i-1}) + \quad (13\text{-a})$$

$$\frac{\varepsilon_{i-1} - 2\varepsilon_i + \varepsilon_{i+1}}{2(\Delta l)^2}(x - x_{i-1})^2;$$

$$x_{i-1} \leq x \leq x_i$$

$$\varepsilon_{n+1} = \varepsilon_{n-2} - 3\varepsilon_{n-1} + 3\varepsilon_n; \text{ (at } i=n) \quad (13\text{-b})$$

Equation (13-a) was generated by standard quadratic interpolation of strain values respectively at three equally spaced strain sensing stations $\{x_{i-1}, x_i, x_{i+1}\}$, and equation (13-b) is the quadratic extrapolation equation to obtain extrapolated strain beyond the embedded beam tip.

Piecewise Integrations

In view of equations (11)-(13-a, b), the curvature-strain differential equation (10) can be piecewise integrated to yield the Curved Displacement Transfer Functions. The piecewise integration of equation (10) within the domain $x_{i-1} \leq x \leq x_i$ between the two adjacent strain-sensing stations 202 $\{x_{i-1}, x_i\}$, yields the slope-angle equation (14):

$$\int_{x_{i-1}}^{x} \underbrace{\frac{d^2\hat{y}}{dx^2}}_{Eq.(5)} dx = \underbrace{\frac{d\hat{y}}{dx}}_{\theta(x)} - \underbrace{\left(\frac{d\hat{y}}{dx}\right)_{i-1}}_{\theta_{i-1}} = \int_{x_{i-1}}^{x} \underbrace{\frac{\varepsilon(x)}{c(x)}}_{Eq.(5)} dx; \quad (14)$$

$$(x_{i-1} \leq x \leq x_i)$$

which can be rewritten in the form of equation (15):

$$\theta(x) = \underbrace{\int_{x_{i-1}}^{x} \frac{\varepsilon(x)}{c(x)} dx}_{\text{Slope increment}} + \underbrace{\theta_{i-1}}_{\substack{\text{Slope} \\ \text{at } x_{i-1}}}; \quad x_{i-1} \leq x \leq x_i \quad (15)$$

Integration of the slope angle equation (14) yields the curved deflection equation (16):

$$\int_{x_{i-1}}^{x}\left[\underbrace{\frac{d\hat{y}}{dx}}_{\theta_x} - \underbrace{\left(\frac{d\hat{y}}{dx}\right)_{i-1}}_{\theta_{i-1}}\right] dx = \quad (16)$$

$$\hat{y}(x) - \underbrace{\hat{y}_{i-1}}_{\substack{\text{Deflection} \\ \text{at } x_{i-1}}} - \underbrace{\int_{x_{i-1}}^{x} \theta_{i-1} dx}_{\substack{\text{Deflection at } x \\ \text{due to } \theta_{i-1}}} = \underbrace{\int_{x_{i-1}}^{x}\int_{x_{i-1}}^{x} \frac{\varepsilon(x)}{c(x)} dx dx}_{\substack{\text{Right hand side} \\ \text{of equation (12)}}}$$

$$(x_{i-1} \leq x \leq x_i)$$

In view of equation (15), equation (16) can be rewritten in the form of equation (17):

$$\hat{y}_x = \underbrace{\int_{x_{i-1}}^{x}\int_{x_{i-1}}^{x} \frac{\varepsilon(x)}{c(x)} dx dx}_{\text{Deflection increment above } \hat{y}_{i-1}} + \underbrace{(x - x_{i-1})\theta_{i-1}}_{\substack{\text{Deflection at } x \\ \text{due to } \theta_{i-1}}} + \underbrace{\hat{y}_{i-1}}_{\substack{\text{Deflection} \\ \text{at } x_{i-1}}} = \quad (17)$$

$$\int_{x_{i-1}}^{x} \theta(x) dx + \hat{y}_{i-1}$$

$$(x_{i-1} \leq x \leq x_i)$$

Using piecewise representations of $\{c(x), \varepsilon(x)\}$ given by equations (11)-(13-a, b), equations (15) and (17) can be integrated within the domain $x_{i-1} \leq x \leq x_i$ to yield the slope and deflection equations in closed recursive and summation forms. A set of three equations (recursive slope equation, recursive deflection equation, and summation deflection equation) are called the Curved Displacement Transfer Functions. The mathematical processes are similar to those used in the piecewise integrations of the shifted curvature-strain differential equation (5) to formulate the Shifted Displacement Displacement Transfer Functions.

Curved Displacement Transfer Functions

After piecewise integrations of equations (15) and (17), one can obtain the Curved Displacement Transfer Functions (18-a, b, c) and (19-a, b, c) for nonuniform embedded beams, including the limit cases of uniform embedded beams ($c_{i-1} = c_i = c$).

Curved Displacement Transfer Functions

The Curved Displacement Transfer Functions (18-a, b, c) were formulated by carrying out piecewise integrations of equations (13) and (15) using piecewise-linear representation of the depth factor c(x) [eq. (11)] variation, and using piecewise-linear representation of the surface strain ε(x) [eq. (12)] variation.

Slope-Angle Equation:

$$\theta_i = \Delta l\left[\frac{\varepsilon_{i-1} - \varepsilon_i}{c_{i-1} - c_i} + \frac{\varepsilon_{i-1}c_i - \varepsilon_i c_{i-1}}{(c_{i-1} - c_i)^2}\log_e\frac{c_i}{c_{i-1}}\right] + \theta_{i-1} \quad (18\text{-a})$$

$$\underbrace{}_{\text{Uniform} \atop (c_{i-1}=c_i=c)} \frac{\Delta l}{2c}(\varepsilon_{i-1} + \varepsilon_i) + \theta_{i-1}$$

$$(i = 1, 2, 3, \ldots, n)$$

Curved deflection equation:
a. In recursive form:

$$\hat{y}_i = \quad (18\text{-b})$$

$$(\Delta l)^2 \left\{ \frac{\varepsilon_{i-1} - \varepsilon_i}{2(c_{i-1} - c_i)} - \frac{\varepsilon_{i-1}c_i - \varepsilon_i c_{i-1}}{(c_{i-1} - c_i)^3} \left[ c_i \log_e \frac{c_i}{c_{i-1}} + (c_{i-1} - c_i) \right] \right\} +$$

$$\hat{y}_{i-1} + (\Delta l)\theta_{i-1} \xrightarrow[(c_{i-1}=c_i=c)]{\text{Uniform}} \frac{(\Delta l)^2}{6c}(2\varepsilon_{i-1} + \varepsilon_i) + \hat{y}_{i-1} + (\Delta l)\theta_{i-1}$$

$$(i = 1, 2, 3, \ldots, n)$$

b. In summation form [equations (18-a) and (18-b) combined]:

$$\hat{y}_i = (\Delta l)^2 \underbrace{\sum_{j=1}^{i} \left\{ \frac{\varepsilon_{j-1} - \varepsilon_j}{2(c_{j-1} - c_j)} - \frac{\varepsilon_{j-1}c_j - \varepsilon_j c_{j-1}}{(c_{j-1} - c_j)^3} + \left[ c_j \log_e \frac{c_j}{c_{j-1}} + (c_{j-1} - c_j) \right] \right\}}_{\text{Contributions from deflection terms}}$$

$$(\Delta l)^2 \underbrace{\sum_{j=1}^{i-1} \left\{ (i-j) \left[ \frac{\varepsilon_{j-1} - \varepsilon_j}{c_{j-1} - c_j} + \frac{\varepsilon_{j-1}c_j - \varepsilon_j c_{j-1}}{(c_{j-1} - c_j)^2} \log_e \frac{c_j}{c_{j-1}} \right] \right\}}_{\text{Contributions from slope terms}} +$$

$$\underbrace{\hat{y}_0 + (i)(\Delta l)\theta_0}_{=0 \text{ for cantilever beams}} \xrightarrow[(c_{i-1}=c_i=c)]{\text{Uniform}} \underbrace{\frac{(\Delta l)^2}{6c} \sum_{j=1}^{i} (2\varepsilon_{j-1} + \varepsilon_j)}_{\text{Contributions from deflection terms}} +$$

$$\underbrace{\frac{(\Delta l)^2}{2c} \sum_{j=1}^{i-1} (i-j)(\varepsilon_{j-1} + \varepsilon_j)}_{\text{Contributions from slope terms}} + \underbrace{\hat{y}_0 + (i)(\Delta l)\theta_0}_{=0 \text{ for cantilever beams}}$$

$$(i = 1, 2, 3, \ldots, n)$$

$$\left[ c_i \log_e \frac{c_i}{c_{i-1}} - (c_i - c_{i-1}) \right] - \frac{(\Delta l)^2}{12(c_i - c_{i-1})^2} [(8c_i - 5c_{i-1})\varepsilon_{i-1} -$$

$$2(5c_i - 2c_{i-1})\varepsilon_i + (2c_i + c_{i-1})\varepsilon_{i+1}] + \hat{y}_{i-1} +$$

$$\Delta l \theta_{i-1} \xrightarrow[(c_{i-1}=c_i=c)]{\text{Uniform}} \frac{(\Delta l)^2}{24c}(7\varepsilon_{i-1} + 6\varepsilon_i - \varepsilon_{i+1}) + \hat{y}_{i-1} + (\Delta l)\theta_{i-1}$$

$$(i = 1, 2, 3, \ldots, n)$$

(18-c)

Equations (18-a, b, c) are called the Curved Displacement Transfer Functions for nonuniform embedded beams ($c_i \neq c_{i-1}$) under large deformation with geometrical nonlinearity including the limit cases of uniform embedded beams ($c_{i-1} = c_i = c$).

Improved Curved Displacement Transfer Functions

In another embodiment, a set of Improved Curved Displacement Transfer Functions may be used. These are represented by the equations (19-a, b, c).

Slope-Angle Equation:

$$\theta_i = \frac{\Delta l}{2(c_i - c_{i-1})^3}[(2c_i - c_{i-1})(c_i \varepsilon_{i-1} - 2c_{i-1}\varepsilon_i) + c_i c_{i-1}\varepsilon_{i+1}] \quad (19\text{-a})$$

$$\log_e \frac{c_i}{c_{i-1}} - \frac{\Delta l}{4(c_i - c_{i-1})^2}[(5c_i - 3c_{i-1})\varepsilon_{i-1} - 2(3c_i - c_{i-1})\varepsilon_i +$$

$$(c_i + c_{i-1})\varepsilon_{i+1}] + \theta_{i-1} \xrightarrow[(c_{i-1}=c_i=c)]{\text{Uniform}} \frac{\Delta l}{12c}(5\varepsilon_{i-1} + 8\varepsilon_i - \varepsilon_{i+1}) + \theta_{i-1}$$

$$(i = 1, 2, 3, \ldots, n)$$

Curved-Deflection Equations:
a. In Recursive Form:

$$\hat{y}_i = \frac{(\Delta l)^2}{2(c_i - c_{i-1})^4}[(2c_i - c_{i-1})(c_i \varepsilon_{i-1} - 2c_{i-1}\varepsilon_i) + c_i c_{i-1}\varepsilon_{i+1}] \quad (19\text{-b})$$

b. In Summation Form [Equations (19-a) and (19-b) Combined]:

$$\hat{y}_i = \quad (19\text{-c})$$

$$(\Delta l)^2 \sum_{j=1}^{i} \underbrace{\left\{ \begin{array}{l} \frac{1}{2(c_j - c_{j-1})^4}[(2c_j - c_{j-1})(c_j \varepsilon_{j-1} - 2c_{j-1}\varepsilon_j) + \\ c_j c_{j-1}\varepsilon_{j+1}] \left[ c_j \log_e \frac{c_j}{c_{j-1}} - (c_j - c_{j-1}) \right] - \\ \frac{1}{12(c_j - c_{j-1})^2}[(8c_j - 5c_{j-1})\varepsilon_{j-1} - 2(5c_j - 2c_{j-1}) \\ \varepsilon_j + (2c_j + c_{j-1})\varepsilon_{j+1}] \end{array} \right\}}_{\text{Contributions from deflection terms}} +$$

$$(\Delta l)^2 \sum_{j=1}^{i-1} (i-j) \underbrace{\left\{ \begin{array}{l} \frac{1}{2(c_j - c_{j-1})^3}[(2c_j - c_{j-1})(c_j \varepsilon_{j-1} - \\ 2c_{j-1}\varepsilon_j) + c_j c_{j-1}\varepsilon_{j+1}] \log_e \frac{c_j}{c_{j-1}} - \\ \frac{1}{4(c_j - c_{j-1})^2}[(5c_j - 3c_{j-1})\varepsilon_{j-1} - 2(3c_j - \\ c_{j-1})\varepsilon_j + (c_j + c_{j-1})\varepsilon_{j+1}] \end{array} \right\}}_{\text{Contributions from slope terms}} +$$

-continued $$\underbrace{\hat{y}_0 + (i)(\Delta l)\theta_0}_{=0 \text{ for cantilever beams}} \xrightarrow{\text{Uniform} \atop (c_{i-1}=c_i=c)} \underbrace{\frac{(\Delta l)^2}{24c} \sum_{j=1}^{i} (7\varepsilon_{j-1} + 6\varepsilon_j - \varepsilon_{j+1})}_{\text{Contributions from deflection terms}} +$$

$$\underbrace{\frac{(\Delta l)^2}{12c} \sum_{j=1}^{i-1} (i-j)(5\varepsilon_{j-1} + 8\varepsilon_j - \varepsilon_{j+1})}_{\text{Contributions from slope terms}} + \underbrace{\hat{y}_0 + (i)(\Delta l)\theta_0}_{=0 \text{ for cantilever beams}}$$

$$(i = 1, 2, 3, \ldots, n)$$

Equations (19-a, b, c) are called the Improved Curved Displacement Transfer Functions for nonuniform embedded beams ($c_i \neq c_{i-1}$) under large deformations with geometrical nonlinearity including the limit cases of uniform embedded beams ($c_{i-1}=c_i=c$).

Characteristics of Displacement Transfer Functions

In the Shifted and Curved Displacement Transfer Functions, the straight and curved deflections $\{y_i, \hat{y}\}$ at the strain-sensing station $x_i$ are expressed in terms of the inboard depth factors ($c_0, c_1, c_2, \ldots, c_i$) and the associated inboard surface strains ($\varepsilon_0, \varepsilon_1, \varepsilon_2, \ldots, \varepsilon_i$) including the values of $\{c_i, \varepsilon_i\}$ at the strain-sensing station $x_i$ where deflections $\{y_i, \hat{y}\}$ are calculated.

It is important to mention that equations (18-a, b, c) and (19-a, b, c) are purely geometrical relationships, containing no material properties. However, it must be understood that the surface strains $\varepsilon_i$ implicitly contain the effect of material properties and internal structural configurations. Thus, in using equations (18-a, b, c) and (19-a, b, c) for shape predictions of complex structures such as aircraft wings, there is no need to know the material properties, nor the complex geometries of the internal structures.

Application to Structures

One example of a structure to which the present invention can be applied is a long tapered cantilever tubular beam. FIG. 2 shows spanwise vertical cross-section (embedded beam) 201 of the tapered cantilever tubular beam with strain sensing lines 204 located on both lower and upper surfaces. In one example, the embedded beam is discretized into n=20 equal domains with domain length of $\Delta l = l n = 300$ in./20=15 in. Thus, there are n+1=21 equally spaced strain-sensing stations 202 along each strain-sensing line 204. Different lateral loads P={50, 100, 200, 300, 400, 500, 600} lb can be applied at the beam tip to study the effect of geometric nonlinearity on the shape predictions under increasing loads (deformations).

For the tubular beam, the local depth factors $c_i$ (i=1, 2, 3, ..., n) are the local outer radius of the tubular beam, and are known. The depth factors $c_i$ remain unchanged because, the magnitudes of the pairs of lower and upper surface strains are identical regardless of the load level. Therefore, only the lower surface strains are needed for inputs to the Displacement Transfer Functions for shape calculations.

Figure 1:
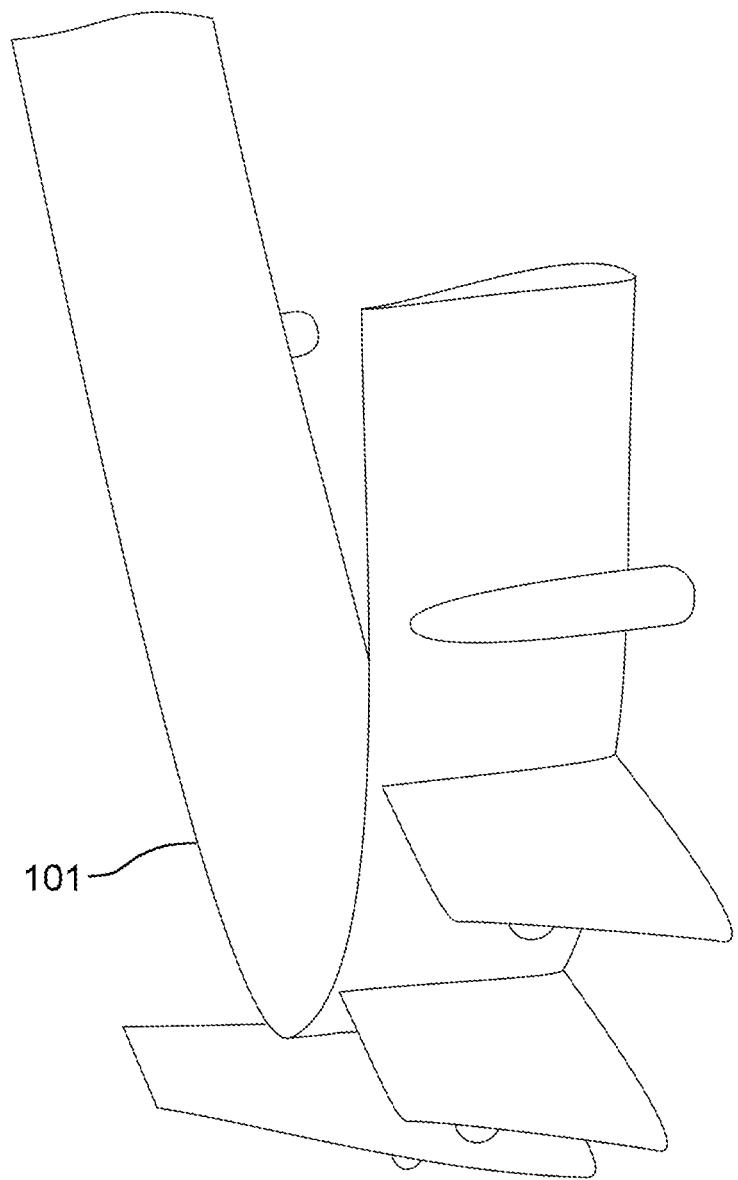
FIG. 1 depicts the Helios prototype under large wing deformation.

However, for large geometric nonlinear deformations (e.g., Helios flying wing, FIG. 1), the lower and the upper strain sensing lines are needed because the magnitudes between the lower and upper surface strains will be slightly different due to the axial strain components induced by the curved-beam effect at large bending 101. Thus, both lower and upper surface strains are needed to calculate the deformation-dependent depth factors $c_i$, which, together with associated lower surface strains $\varepsilon_i$, can then be input to the Displacement Transfer Functions for shape calculations.

What is described are specific examples of variations on the same invention and are not intended in a limiting sense. The claimed invention can be practiced using other variations not specifically described above.

We claim:

1. A method for obtaining control of a structure having a depth with a neutral axis and length, the method comprising:
   dividing the structure into a plurality of sections, the sections having equal lengths;
   providing strain sensors adjacent to each section;
   obtaining strain measurements from said strain; and
   calculating a curved displacement of the structure out of a plane from the neutral axis using the strain measurements, the structure length, the strain sensor distances from the neutral axis, and the section length;
   wherein the curved displacement provides information regarding one or more material properties of the structure that are used to adjust one or more movements of the structure;
   wherein the curved displacement of the structure is calculated using the algorithm:

$$\hat{y}_i = (\Delta l)^2 \left\{ \frac{\varepsilon_{i-1} - \varepsilon_i}{2(c_{i-1} - c_i)} - \frac{\varepsilon_{i-1}c_i - \varepsilon_i c_{i-1}}{(c_{i-1} - c_i)^3} \left[ c_i \log_e \frac{c_i}{c_{i-1}} + (c_{i-1} - c_i) \right] \right\} +$$

$$\hat{y}_{i-1} + (\Delta l)\theta_{i-1} \xrightarrow{\text{Uniform} \atop (c_{i-1}=c_i=c)} \frac{(\Delta l)^2}{6c}(2\varepsilon_{i-1} + \varepsilon_i) + \hat{y}_{i-1} + (\Delta l)\theta_{i-1}$$

$$(i = 1, 2, 3, \ldots, n)$$

where $\hat{y}$ is the curved displacement at strain sensor location $x_i$, $\Delta l$ is the distance between two adjacent strain sensors, l is the length of the structure, c is the distance from the strain sensor location to the neutral axis and $\varepsilon$ is the measured strain at each strain sensor location.

2. The method of claim 1, wherein the strain sensors comprise a location at a first end of each section, the locations defined as $x_0, x_1, x_2, \ldots x_n$, wherein n is the number of strain sensors and $x_0$ is located at a first end of the structure, $x_n$ is located at a second end of the structure, and the remaining strain sensors are located in numerical order between $x_0$ and $x_n$.

3. The method of claim 2, wherein the calculating step comprises summing the curved displacement at location $x_i$ with the curved displacement at locations $x_0$ through $x_{i-1}$.

4. The method of claim 3, wherein the calculating step comprises the use of the algorithm:

$$\hat{y}_i =$$

$$(\Delta l)^2 \underbrace{\sum_{j=1}^{i} \left\{ \frac{\varepsilon_{j-1} - \varepsilon_j}{2(c_{j-1} - c_j)} - \frac{\varepsilon_{j-1}c_j - \varepsilon_j c_{j-1}}{(c_{j-1} - c_j)^3} \left[ c_j \log_e \frac{c_j}{c_{j-1}} + (c_{j-1} - c_j) \right] \right\}}_{\text{Contributions from deflection terms}} +$$

$$(\Delta l)^2 \underbrace{\sum_{j=1}^{i-1} \left\{ (i-j) \left[ \frac{\varepsilon_{j-1} - \varepsilon_j}{c_{j-1} - c_j} + \frac{\varepsilon_{j-1}c_j - \varepsilon_j c_{j-1}}{(c_{j-1} - c_j)^2} \log_e \frac{c_j}{c_{j-1}} \right] \right\}}_{\text{Contributions from slope terms}} +$$

-continued $$\underbrace{\hat{y}_0 + (i)(\Delta l)\theta_0}_{=0 \text{ for cantilever beams}} \xrightarrow[(c_{i-1}=c_i=c)]{\text{Uniform}} \underbrace{\frac{(\Delta l)^2}{6c} \sum_{j=1}^{i} (2\varepsilon_{j-1} + \varepsilon_j)}_{\text{Contributions from deflection terms}} +$$

$$\underbrace{\frac{(\Delta l)^2}{2c} \sum_{j=1}^{i-1} (i-j)(\varepsilon_{j-1} + \varepsilon_j)}_{\text{Contributions from slope terms}} + \underbrace{\hat{y}_0 + (i)(\Delta l)\theta_0}_{=0 \text{ for cantilever beams}}$$

$(i = 1, 2, 3, \ldots, n)$ where $\hat{y}$ is the curved displacement at strain sensor location $x_i$, $\Delta l$ is the distance between two adjacent strain sensors, l is the length of the structure, c is the distance from the strain sensor location to the neutral axis and ε is the measured strain at each strain sensor location.

5. The method of claim 3, wherein the calculating step comprises the use of the algorithm:

$$\hat{y}_i = (\Delta l)^2 \sum_{j=1}^{i} \left\{ \begin{array}{l} \frac{1}{2(c_j - c_{j-1})^4}[(2c_j - c_{j-1})(c_j\varepsilon_{j-1} - 2c_{j-1}\varepsilon_j) + \\ c_j c_{j-1}\varepsilon_{j+1}]\left[c_j \log_e \frac{c_j}{c_{j-1}} - (c_j - c_{j-1})\right] - \\ \frac{1}{12(c_j - c_{j-1})^2}[(8c_j - 5c_{j-1})\varepsilon_{j-1} - 2(5c_j - 2c_{j-1}) \\ \varepsilon_j + (2c_j + c_{j-1})\varepsilon_{j+1}] \end{array} \right\} +$$

Contributions from deflection terms $$(\Delta l)^2 \sum_{j=1}^{i-1} (i-j) \left\{ \begin{array}{l} \frac{1}{2(c_j - c_{j-1})^3}[(2c_j - c_{j-1})(c_j\varepsilon_{j-1} - \\ 2c_{j-1}\varepsilon_j) + c_j c_{j-1}\varepsilon_{j+1}]\log_e \frac{c_j}{c_{j-1}} - \\ \frac{1}{4(c_j - c_{j-1})^2}[(5c_j - 3c_{j-1})\varepsilon_{j-1} - 2(3c_j - \\ c_{j-1})\varepsilon_j + (c_j + c_{j-1})\varepsilon_{j+1}] \end{array} \right\} +$$

Contributions from slope terms $$\underbrace{\hat{y}_0 + (i)(\Delta l)\theta_0}_{=0 \text{ for cantilever beams}} \xrightarrow[(c_{i-1}=c_i=c)]{\text{Uniform}} \underbrace{\frac{(\Delta l)^2}{24c} \sum_{j=1}^{i} (7\varepsilon_{j-1} + 6\varepsilon_j - \varepsilon_{j+1})}_{\text{Contributions from deflection terms}} +$$

$$\underbrace{\frac{(\Delta l)^2}{12c} \sum_{j=1}^{i-1} (i-j)(5\varepsilon_{j-1} + 8\varepsilon_j - \varepsilon_{j+1})}_{\text{Contributions from slope terms}} + \underbrace{\hat{y}_0 + (i)(\Delta l)\theta_0}_{=0 \text{ for cantilever beams}}$$

$(i = 1, 2, 3, \ldots, n)$ where $\hat{y}$ is the curved displacement at strain sensor location $x_i$, $\Delta l$ is the distance between two adjacent strain sensors, l is the length of the structure, c is the distance from the strain sensor location to the neutral axis and ε is the measured strain at each strain sensor location.

6. The method of claim 3, further comprising calculating a distance from a strain sensor location to the neutral axis from strain sensing lines located on upper and lower surfaces of the structure.

7. The method of claim 1, wherein the structure is flexible.

8. A method for obtaining control of a structure having a depth with a neutral axis and length, the method comprising: dividing the structure into a plurality of sections, the sections having equal lengths;

providing strain sensors adjacent to each section;

obtaining strain measurements from said strain; and calculating a curved displacement of the structure out of a plane from the neutral axis using the strain measurements, the structure length, the strain sensor distances from the neutral axis, and the section length;

wherein the curved displacement provides information regarding one or more material properties of the structure that are used to adjust one or more movements of the structure;

wherein the curved displacement of the structure is calculated using the algorithm:

$$\hat{y}_i = \frac{(\Delta l)^2}{2(c_i - c_{i-1})^4}[(2c_i - c_{i-1})(c_i\varepsilon_{i-1} - 2c_{i-1}\varepsilon_i) + c_i c_{i-1}\varepsilon_{i+1}]$$

$$\left[c_i \log_e \frac{c_i}{c_{i-1}} - (c_i - c_{i-1})\right] - \frac{(\Delta l)^2}{12(c_i - c_{i-1})^2}$$

$$[(8c_i - 5c_{i-1})\varepsilon_{i-1} - 2(5c_i - 2c_{i-1})\varepsilon_i + (2c_i + c_{i-1})\varepsilon_{i+1}] + \hat{y}_{i-1} +$$

$$\Delta l\theta_{i-1} \xrightarrow[(c_{i-1}=c_i=c)]{\text{Uniform}} \frac{(\Delta l)^2}{24c}(7\varepsilon_{i-1} + 6\varepsilon_i - \varepsilon_{i+1}) + \hat{y}_{i-1} + (\Delta l)\theta_{i-1}$$

$(i = 1, 2, 3, \ldots, n)$ where $\hat{y}$ is the curved displacement at strain sensor location $x_i$, $\Delta l$ is the distance between two adjacent strain sensors, l is the length of the structure, c is the distance from the strain sensor location to the neutral axis and ε is the measured strain at each strain sensor location.

9. The method of claim 8, wherein the strain sensors comprise a location at a first end of each section, the locations defined as $x_0, x_1, x_2, \ldots x_n$, wherein n is the number of strain sensors and $x_0$ is located at a first end of the structure, $x_n$ is located at a second end of the structure, and the remaining strain sensors are located in numerical order between $x_0$ and $x_n$.

10. The method of claim 9, wherein the calculating step comprises summing the curved displacement at location $x_i$ with the curved displacement at locations $x_0$ through $x_{i-1}$.

11. The method of claim 10, wherein the calculating step comprises the use of the algorithm:

$$\hat{y}_i = \frac{(\Delta l)^2 \sum_{j=1}^{i} \left\{ \frac{\varepsilon_{j-1} - \varepsilon_j}{2(c_{j-1} - c_j)} - \frac{\varepsilon_{j-1}c_j - \varepsilon_j c_{j-1}}{(c_{j-1} - c_j)^3} \right.}{\left[c_j \log_e \frac{c_j}{c_{j-1}} + (c_{j-1} - c_j)\right]\right\}} +$$

Contributions from deflection terms $$(\Delta l)^2 \sum_{j=1}^{i-1} \left\{ (i-j)\left[\frac{\varepsilon_{j-1} - \varepsilon_j}{c_{j-1} - c_j} + \frac{\varepsilon_{j-1}c_j - \varepsilon_j c_{j-1}}{(c_{j-1} - c_j)^2} \log_e \frac{c_j}{c_{j-1}}\right]\right\} +$$

Contributions from slope terms $$\underbrace{\hat{y}_0 + (i)(\Delta l)\theta_0}_{=0 \text{ for cantilever beams}} \xrightarrow[(c_{i-1}=c_i=c)]{\text{Uniform}} \underbrace{\frac{(\Delta l)^2}{6c} \sum_{j=1}^{i}(2\varepsilon_{j-1} + \varepsilon_j)}_{\text{Contributions from deflection terms}} +$$

$$\underbrace{\frac{(\Delta l)^2}{2c} \sum_{j=1}^{i-1}(i-j)(\varepsilon_{j-1} + \varepsilon_j) + \underbrace{\hat{y}_0 + (i)(\Delta l)\theta_0}_{=0 \text{ for cantilever beams}}}_{\text{Contributions from slope terms}}$$

$(i = 1, 2, 3, \ldots, n)$ where $\hat{y}$ is the curved displacement at strain sensor location $x_i$, $\Delta l$ is the distance between two adjacent strain sensors, l is the length of the structure, c is the distance from the strain sensor location to the neutral axis and ε is the measured strain at each strain sensor location.

12. The method of claim 10, wherein the calculating step comprises the use of the algorithm:

$$\hat{y}_i = (\Delta l)^2 \sum_{j=1}^{i} \left\{ \begin{array}{c} \frac{1}{2(c_j-c_{j-1})^4}[(2c_j-c_{j-1})(c_j\varepsilon_{j-1} - 2c_{j-1}\varepsilon_j) + \\ c_jc_{j-1}\varepsilon_{j+1}]\left[c_j\log_e\frac{c_j}{c_{j-1}} - (c_j-c_{j-1})\right] - \\ \frac{1}{12(c_j-c_{j-1})^2}[(8c_j-5c_{j-1})\varepsilon_{j-1} - 2(5c_j-2c_{j-1}) \\ \varepsilon_j + (2c_j+c_{j-1})\varepsilon_{j+1}] \end{array} \right\}_{\text{Contributions from deflection terms}} +$$

$$(\Delta l)^2 \sum_{j=1}^{i-1}(i-j) \left\{ \begin{array}{c} \frac{1}{2(c_j-c_{j-1})^3}[(2c_j-c_{j-1})(c_j\varepsilon_{j-1} - \\ 2c_{j-1}\varepsilon_j) + c_jc_{j-1}\varepsilon_{j+1}]\log_e\frac{c_j}{c_{j-1}} - \\ \frac{1}{4(c_j-c_{j-1})^2}[(5c_j-3c_{j-1})\varepsilon_{j-1} - 2(3c_j - \\ c_{j-1})\varepsilon_j + (c_j+c_{j-1})\varepsilon_{j+1}] \end{array} \right\} +$$

Contributions from slope terms $$\underbrace{\hat{y}_0 + (i)(\Delta l)\theta_0}_{=0 \text{ for cantilever beams}} \xrightarrow[(c_{i-1}=c_i=c)]{\text{Uniform}} \underbrace{\frac{(\Delta l)^2}{24c} \sum_{j=1}^{i}(7\varepsilon_{j-1} + 6\varepsilon_j - \varepsilon_{j+1})}_{\text{Contributions from deflection terms}} +$$

$$\underbrace{\frac{(\Delta l)^2}{12c} \sum_{j=1}^{i-1}(i-j)(5\varepsilon_{j-1} + 8\varepsilon_j - \varepsilon_{j+1}) + \underbrace{\hat{y}_0 + (i)(\Delta l)\theta_0}_{=0 \text{ for cantilever beams}}}_{\text{Contributions from slope terms}}$$

$(i = 1, 2, 3, \ldots, n)$ where $\hat{y}$ is the curved displacement at strain sensor location $x_i$, $\Delta l$ is the distance between two adjacent strain sensors, l is the length of the structure, c is the distance from the strain sensor location to the neutral axis and ε is the measured strain at each strain sensor location.

13. The method of claim 10, further comprising calculating a distance from a strain sensor location to the neutral axis from strain sensing lines located on upper and lower surfaces of the structure.

14. The method of claim 8, wherein the structure is flexible.

* * * * *